United States Patent
Kondo

(10) Patent No.: US 11,555,633 B2
(45) Date of Patent: Jan. 17, 2023

(54) HEATING AND HOT WATER SUPPLY SYSTEM

(71) Applicant: NORITZ CORPORATION, Hyogo (JP)

(72) Inventor: Masaki Kondo, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 137 days.

(21) Appl. No.: 17/067,756

(22) Filed: Oct. 11, 2020

(65) Prior Publication Data
US 2021/0123631 A1    Apr. 29, 2021

(30) Foreign Application Priority Data
Oct. 25, 2019 (JP) .............................. JP2019-194381

(51) Int. Cl.
*F24H 1/48* (2022.01)
*F24H 1/12* (2022.01)

(52) U.S. Cl.
CPC .............. *F24H 1/48* (2013.01); *F24H 1/124* (2013.01)

(58) Field of Classification Search
None
See application file for complete search history.

(56) References Cited

U.S. PATENT DOCUMENTS

| 2009/0133861 A1* | 5/2009 | Kim ............................. 165/170 |
| 2017/0131035 A1* | 5/2017 | Honnorat ............. F28D 9/0043 |
| 2017/0335740 A1* | 11/2017 | Dries ........................ F01N 5/02 |

FOREIGN PATENT DOCUMENTS

JP    2007187419    7/2007

* cited by examiner

*Primary Examiner* — Steven B McAllister
*Assistant Examiner* — John E Bargero
(74) *Attorney, Agent, or Firm* — JCIPRNET

(57) ABSTRACT

A heating and hot water supply system, including: a combustion unit combusting a fuel to generate a combustion gas; a heat exchange unit heating a heat medium and hot water according to heat exchange with the combustion gas; an exhaust unit that exhausting the combustion gas after heat exchange. The heat exchange unit includes a plate type heat exchanger by laminating vertically-upright rectangular plates with gaps, and is configured to heat the heat medium by causing the combustion gas and the heat medium to alternately flow through the gaps. An inlet for the heat medium is provided at lower corner of the plate type heat exchanger, a discharge opening for the heat medium is provided at upper corner farthest from the inlet, and a hot water passage through which hot water flows in the plate type heat exchanger is provided at upper corner above the inlet.

10 Claims, 8 Drawing Sheets

HEATING AND HOT WATER SUPPLY SYSTEM

CROSS REFERENCE TO RELATED APPLICATIONS

This application claims the priority benefit of Japanese Patent Application No. 2019-194381, filed on Oct. 25, 2019. The entirety of the above-mentioned patent application is hereby incorporated by reference herein and made a part of this specification.

BACKGROUND

Technical Field

The disclosure relates to a heating and hot water supply system which includes a plate type heat exchanger that heats a heat medium for heating supplied to a heating terminal, and supplies hot water heated using the heat medium for heating.

Description of Related Art

In the related art, heating and hot water supply systems having both a heating function and a hot water supply function have been widely used. For example, as in Patent Document 1 (Japanese Patent Application Laid-Open No. 2007-187419), a heating and hot water supply system that heats a heat medium for heating using combustion heat for heating and hot water supply and supplies hot water heated using the heated heat medium for heating is known.

A heating and hot water supply system in Patent Document 1 includes a primary heat exchanger that collects sensible heat of a combustion gas and a secondary heat exchanger that collects latent heat of a combustion gas, and improves energy efficiency. In the secondary heat exchanger, a heat medium for heating having a low temperature is introduced and heated, and the heat medium for heating heated in the secondary heat exchanger is introduced into the primary heat exchanger and additionally heated. In the secondary heat exchanger, water vapor contained in the combustion gas is condensed to generate drainage water.

Since the generated drainage water is strongly acidic, the secondary heat exchanger may be formed of a heat transfer tube made of an acid-resistant stainless steel, and the secondary heat exchanger of the heating and hot water supply system in Patent Document 1 is also formed of such a heat transfer tube. In order to improve a latent heat collection function by increasing a surface area of the heat transfer tube, the heat transfer tube is branched into a plurality of thin heat transfer tubes, and these thin heat transfer tubes are bent, for example, in a spiral shape or a meandering shape, to form a secondary heat exchanger.

In the secondary heat exchanger, the heat medium for heating which has been used for heating and hot water supply and whose temperature is reduced is introduced. Since the temperature of the heat medium for heating does not become as low as that of tap water, there is a risk of latent heat not being sufficiently collected in the secondary heat exchanger. Therefore, the heating and hot water supply system in Patent Document 1 includes the secondary heat exchanger for hot water supply, which is formed of a heat transfer tube for circulating tap water.

In the secondary heat exchanger formed of heat transfer tubes, it is necessary to dispose the plurality of heat transfer tubes with gaps therebetween for allowing a combustion gas to circulate, and it is not easy to tightly bend the heat transfer tubes, and thus it is not easy to reduce the size. Therefore, regarding a small secondary heat exchanger, a plate type heat exchanger formed by laminating a plurality of stainless steel plates with gaps therebetween is used. The plate type heat exchanger exchanges heat between a combustion gas and a heat medium for heating by causing the combustion gas and the heat medium for heating to alternately flow through the plurality of gaps between the plurality of plates, and thus the heat medium for heating is heated.

The secondary heat exchanger for hot water supply for circulating tap water can be a plate type heat exchanger. However, since two secondary heat exchangers are disposed, this is not preferable because the size of the heating and hot water supply system increases, and production costs also increase.

SUMMARY

The disclosure provides a small heating and hot water supply system having an improved latent heat collection function.

According to one embodiment, the disclosure provides a heating and hot water supply system, and the system includes a combustion unit that combusts a fuel to generate a combustion gas; a heat exchange unit that heats a heat medium for heating and hot water for hot water supply according to exchange of heat with the combustion gas; and an exhaust unit that exhausts the combustion gas after heat exchange. The heat exchange unit includes a plate type heat exchanger formed by laminating a plurality of vertically upright rectangular plates with gaps therebetween, and is configured to heat the heat medium for heating by causing the combustion gas and the heat medium for heating to alternately flow through the plurality of gaps of the plate type heat exchanger. An inlet for the heat medium for heating is provided at a lower corner part of the plate type heat exchanger, a discharge opening for the heat medium for heating is provided at an upper corner part farthest from the inlet, and a hot water passage for hot water supply through which the hot water for hot water supply flows in a plate lamination direction in the plate type heat exchanger is provided at an upper corner part on the side above the inlet.

DESCRIPTION OF THE EMBODIMENTS

Forms for implementing the disclosure will be described below with reference to examples.

EXAMPLES

First, an overall configuration of a heating and hot water supply system 1 will be described.

Figure 1:
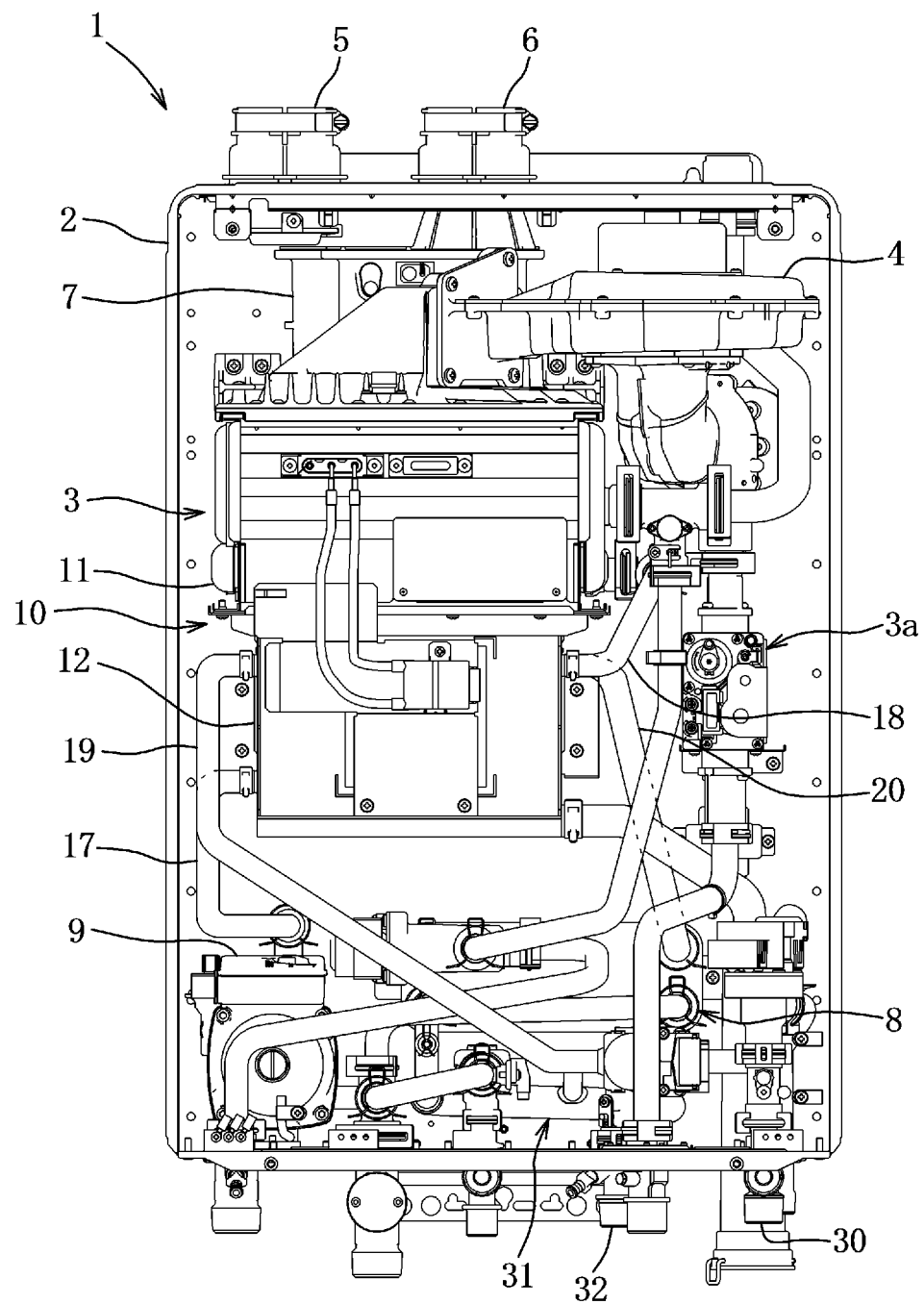
FIG. 1 is a front view of a water heating device from which a front cover is removed according to an example of the disclosure.

As shown in FIG. 1, the heating and hot water supply system 1 includes, inside an exterior case 2, a combustion part 3 (combustion unit) having a burner and a combustion space for combusting a fuel directed downward, a blower fan 4 that supplies combustion air to the combustion part 3, a heat exchange part 10 (heat exchange unit) that is disposed below the combustion part 3, and an exhaust duct 7 (exhaust unit) through which combustion gas after heat exchange is guided from the heat exchange part 10 to an upper exhaust tube 6. In addition, a pump 9 that circulates a heat medium (heat medium for heating) between the heat exchange part 10 and a heat exchanger for hot water supply 8, and between the heat exchange part 10 and an external heating terminal and the like are provided. The exterior case 2 is a box formed of a metal thin plate and having an open front surface, and a front panel (not shown) covering the front surface is removable.

The blower fan 4 supplies air supplied from an air supply tube 5 in an upper surface part of the exterior case 2 into the exterior case 2 to the combustion part 3. The combustion part 3 uses air supplied from the blower fan 4, combusts a fuel (for example, natural gas, oil, etc.) supplied from a fuel supply part 3a downward, and generates a combustion gas. The combustion gas flows downward together with air supplied from the blower fan 4 and is supplied to the heat exchange part 10.

In the heat exchange part 10, the heat medium supplied from the pump 9 is heated according to exchange of heat with the combustion gas supplied from the combustion part 3. The heated heat medium is supplied to the heat exchanger for hot water supply 8 and an external heating terminal. In the heat exchanger for hot water supply 8, tap water that is supplied from a water supply part 30 and heated in the heat exchange part 10 is further heated according to exchange of heat with the heat medium supplied from the heat exchange part 10. The hot water heated in the heat exchanger for hot water supply 8 is mixed with tap water in a mixing unit 31, and the temperature thereof is adjusted, and the water is supplied from a hot water supply unit 32 to a hot water tap (not shown) or the like.

The heat exchange part 10 includes, for example, a fin and tube type primary heat exchanger 11 that collects sensible heat of a combustion gas and heats a heat medium and a plate type secondary heat exchanger 12 that collects latent heat of a combustion gas and heats a heat medium. The combustion gas supplied from the combustion part 3 heats the heat medium in the primary heat exchanger 11 and lowers the temperature. The combustion gas whose temperature is lowered heats the heat medium in the secondary heat exchanger 12 and the temperature thereof is further lowered. The heat medium is heated in the secondary heat exchanger 12 to some extent and then heated to a higher temperature in the primary heat exchanger 11, and is supplied to the heat exchanger for hot water supply 8 and the heating terminal.

The exhaust duct 7 is attached to the secondary heat exchanger 12 of the heat exchange part 10. The exhaust duct 7 guides the combustion gas discharged from the secondary heat exchanger 12 to the exhaust tube 6 above the exterior case 2. Then, the combustion gas is exhausted from the exhaust tube 6 to the outside of the heating and hot water supply system 1.

Next, the secondary heat exchanger 12 will be described.

Figure 2:
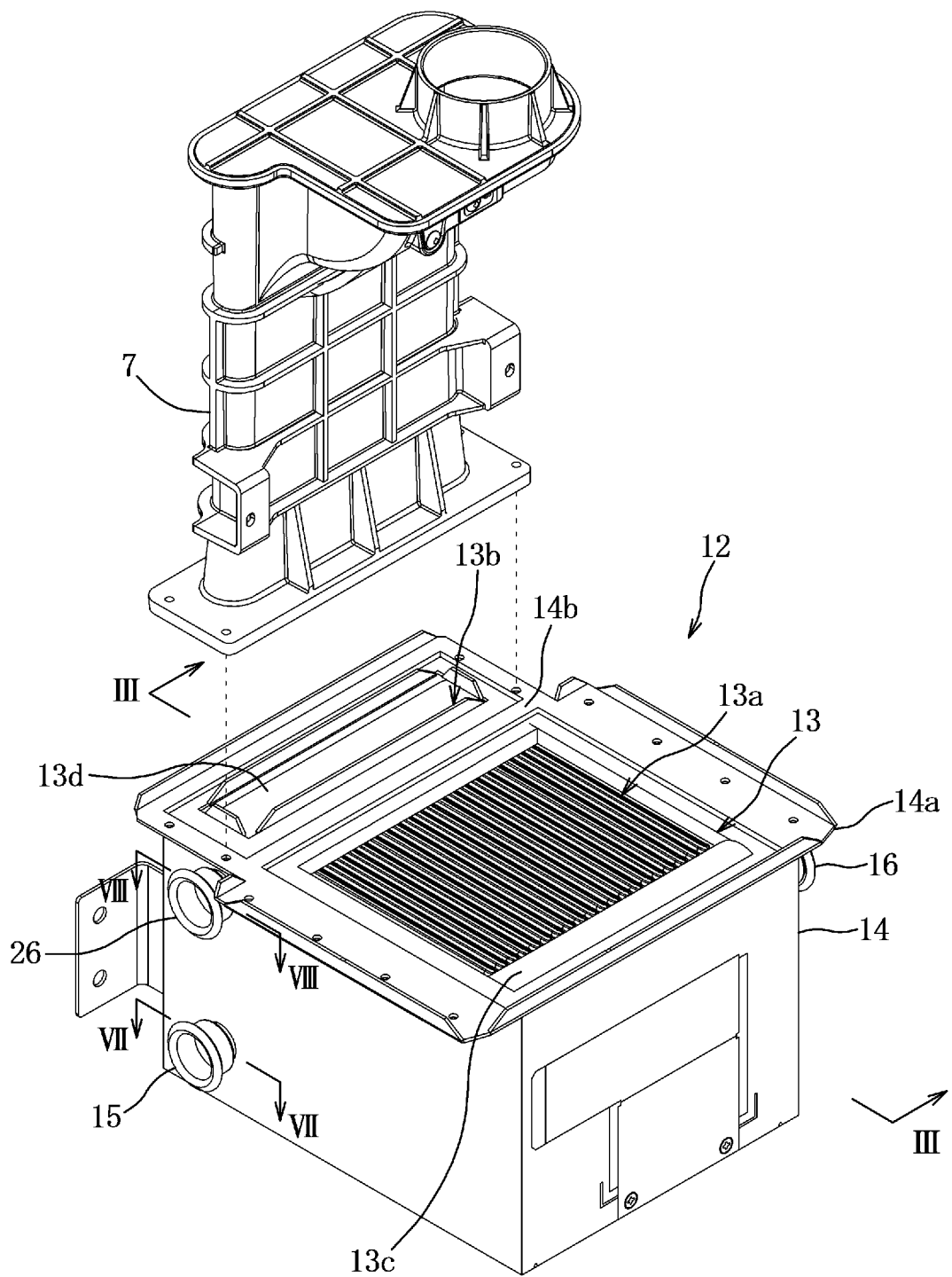
FIG. 2 is an exploded perspective view of main parts of a secondary heat exchanger and an exhaust tube according to an example.

As shown in FIG. 2, the secondary heat exchanger 12 includes, for example, a plate laminate 13 formed by laminating a plurality of (for example, 50) stainless steel rectangular plates and a secondary heat exchange case 14 in which the plate laminate 13 is accommodated. The plate laminate 13 is formed by laminating a plurality of vertically upright plates in the horizontal direction, and is accommodated in the secondary heat exchange case 14. The plurality of plates is laminated such that there is a gap between adjacent plates, and the heat medium is heated by causing the combustion gas and the heat medium to alternately flow through the plurality of gaps of the plate laminate 13.

An inlet 15 for the heat medium connected to a lower corner part of the plate laminate 13 is provided in a projection shape at the lower part of the side surface part of the secondary heat exchange case 14. In addition, a discharge opening 16 for the heat medium connected to the upper corner part of the plate laminate 13 farthest from the inlet 15 is provided in a projection shape at the upper part of the side surface part of the secondary heat exchange case 14 on the side opposite to the inlet 15. Directly above the inlet 15, a hot water inlet for hot water supply 26 connected to the upper corner part of the plate laminate 13 is provided in a projection shape at the upper part of the side surface part of the secondary heat exchange case 14. A hot water discharge opening for hot water supply 27 to be described below is provided in a projection shape at the upper part of the side surface part of the secondary heat exchange case 14 on the side of the discharge opening 16 to face the hot water inlet for hot water supply 26.

As shown in FIG. 1, the pump 9 and the inlet 15 are connected by a pipe member 17, and the discharge opening 16 and an inlet for the heat medium of the primary heat exchanger 11 are connected by a pipe member 18. In addition, the water supply part 30 and the hot water inlet for hot water supply 26 are connected by a pipe member 19, and the hot water discharge opening for hot water supply 27 and a hot water inlet for hot water supply of the heat exchanger for hot water supply 8 are connected by a pipe member 20.

Figure 3:
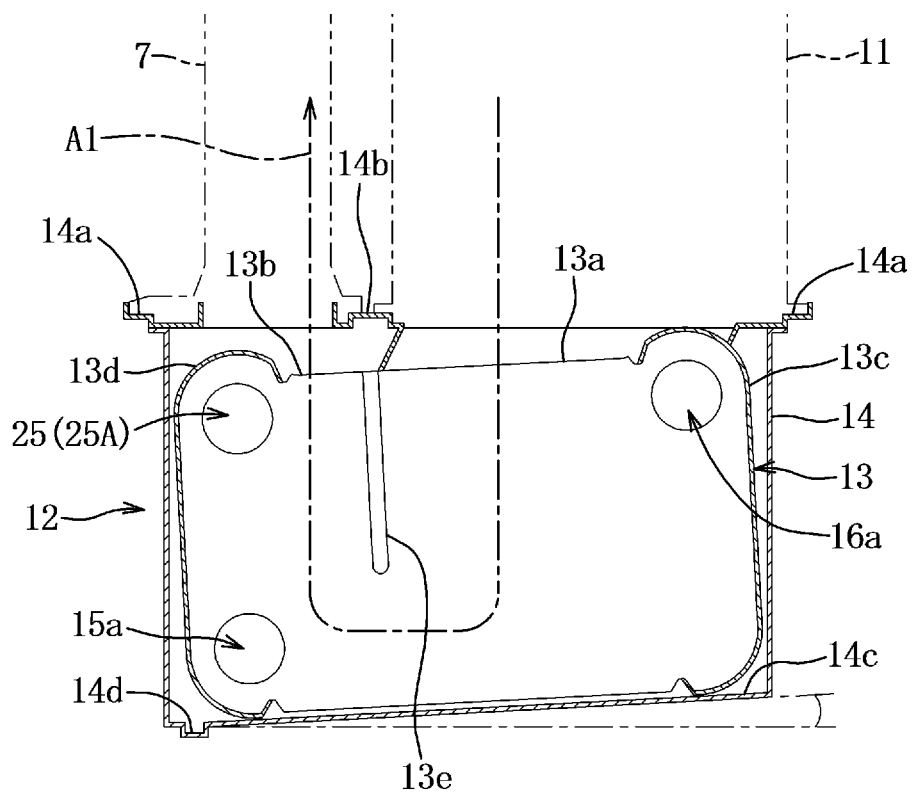
FIG. 3 is a cross-sectional view of the secondary heat exchanger in FIG. 2 taken along the line III-III.

As shown in FIG. 2 and FIG. 3, the secondary heat exchange case 14 is formed in a box having an open upper surface. On the upper end part of the secondary heat exchange case 14, a flange part 14a for connecting the primary heat exchanger 11 and the exhaust duct 7, and a partition 14b for partitioning the primary heat exchanger 11 and the exhaust duct 7 are provided. The opening on the side of the primary heat exchanger 11 partitioned by the partition 14b communicates with an introduction part 13a through which the combustion gas in the plate laminate 13 is introduced, and the opening on the side of the exhaust duct 7 communicates with a discharge part 13b of the plate laminate 13. Here, although not shown, a gasket for preventing leakage of a combustion gas is disposed at a part connecting the primary heat exchanger 11 and the exhaust duct 7, and the secondary heat exchange case 14.

The introduction part 13a and the discharge part 13b of the plate laminate 13 are both formed on the same surface (upper surface) side by side. Therefore, the exhaust duct 7 can be made shorter and disposed so that it does not pass through the side of the plate laminate 13.

In the secondary heat exchange case 14, when the flange part 14a is horizontally set, a bottom 14c is gently inclined so that the side of the discharge part 13b becomes lower. Drainage water obtained by condensing water vapor in the combustion gas flows down from the inclined bottom 14c and is collected in a groove 14d, and discharged from the groove 14d to the outside of the secondary heat exchange case 14, and is subjected to a neutralization treatment and the like and drained. In order not to prevent drainage water from flowing down, the plate laminate 13 abutting the bottom 14c of the secondary heat exchange case 14 is accommodated in the secondary heat exchange case 14 so that all vertically upright plates are parallel to the inclination direction.

At two side surface parts facing the plurality of gaps of the plate laminate 13 and corner parts that are curved and connected from these side surface parts to the upper surface part and the lower surface part, cover members 13c and 13d are disposed so that the combustion gas does not escape outside of the plate laminate 13. An arrow A1 indicates an example of a combustion gas flow. The combustion gas is vertically or almost vertically introduced from the upper primary heat exchanger 11 to the introduction part 13a of the plate laminate 13. Since a range in which the introduced combustion gas can flow is regulated by the plate, the cover members 13c and 13d, and the bottom 14c of the secondary heat exchange case 14, a flow direction is reversed in the plate laminate 13, and the introduced combustion gas is discharged from the discharge part 13b.

A peripheral part of the opening that communicates with the introduction part 13a is bent downward so that it abuts the upper end of the plate laminate 13 in order to block a gap with the upper end of the plate laminate 13 therebetween. A member for blocking a gap may be present. Therefore, the amount of combustion gas that flows between the plate laminate 13 and the secondary heat exchange case 14 and does not contribute to heat exchange is reduced.

The plate laminate 13 includes the introduction part 13a and a regulating part 13e corresponding to the discharge part 13b. The regulating part 13e is formed so that it extends toward the opposite side from the side of the introduction part 13a (upper surface side) to the middle part of the plate laminate 13 in the vertical direction. Thus, the combustion gas introduced into the introduction part 13a is regulated by the regulating part 13e so that it does not flow toward the discharge part 13b in the horizontal direction. Therefore, the combustion gas flows vertically in order to flow horizontally flow through a lower part of the plate laminate 13 in which a horizontal flow is not regulated so that the flow distance becomes longer and an opportunity for heat exchange increases.

Next, the plate laminate 13 will be described.

Figure 4:
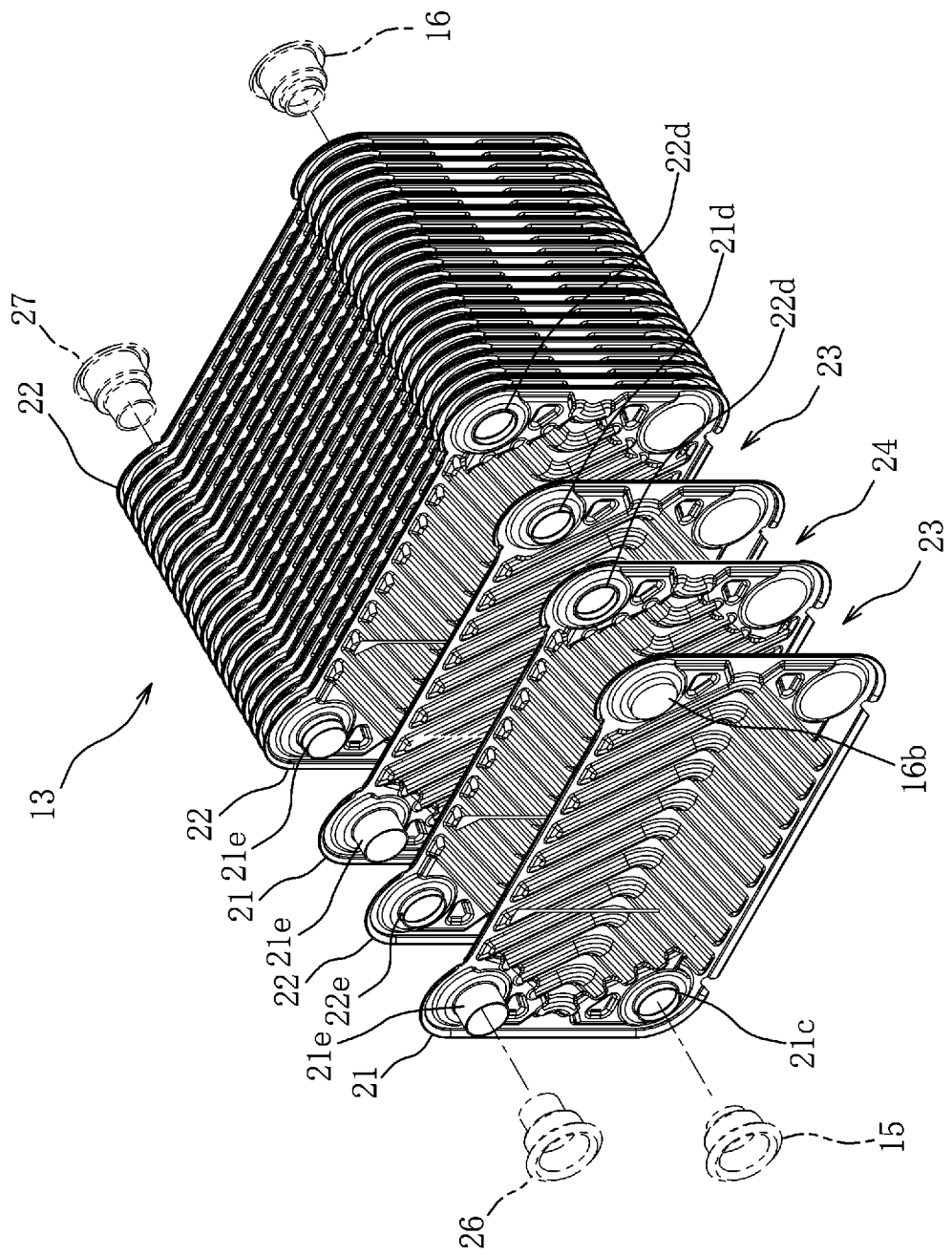
FIG. 4 is an exploded perspective view of main parts of a plate laminate according to an example.
Figure 5:
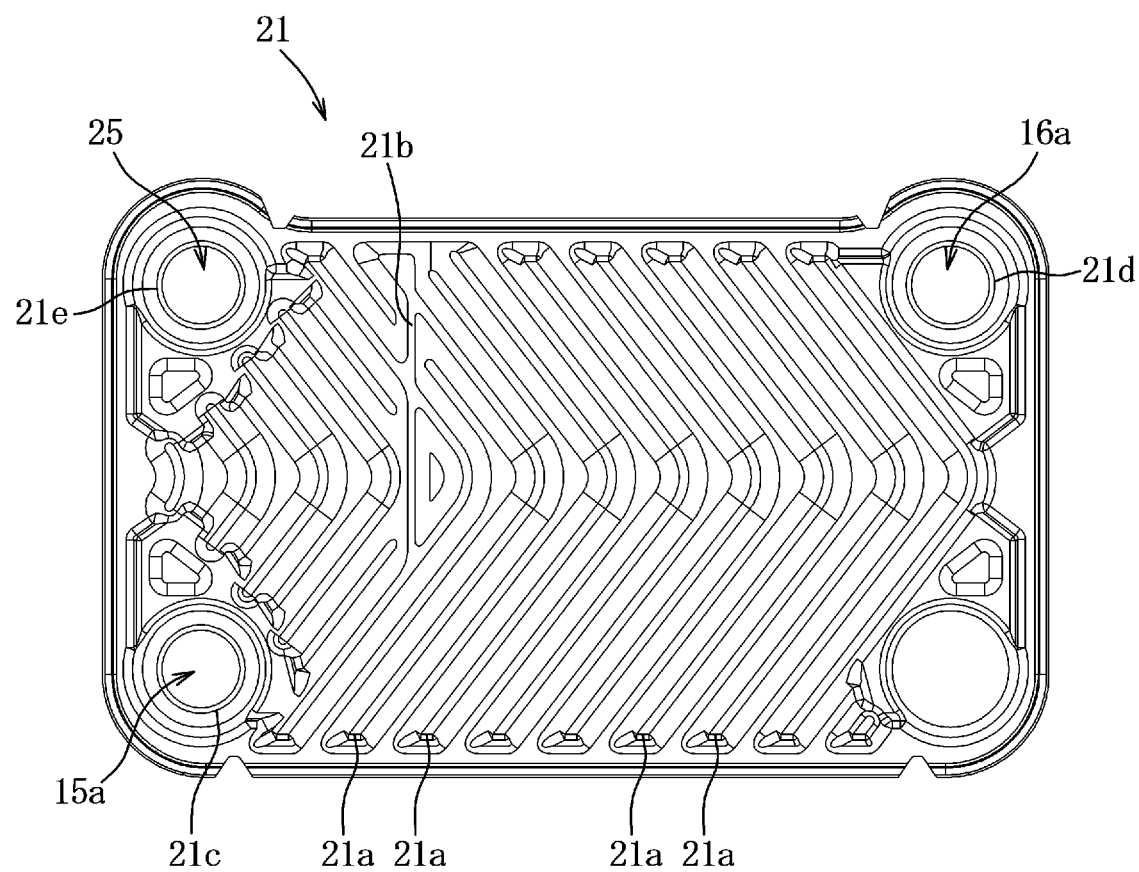
FIG. 5 is a side view of a first plate of the plate laminate in FIG. 4 when viewed from the side of a hot water inlet.
Figure 6:
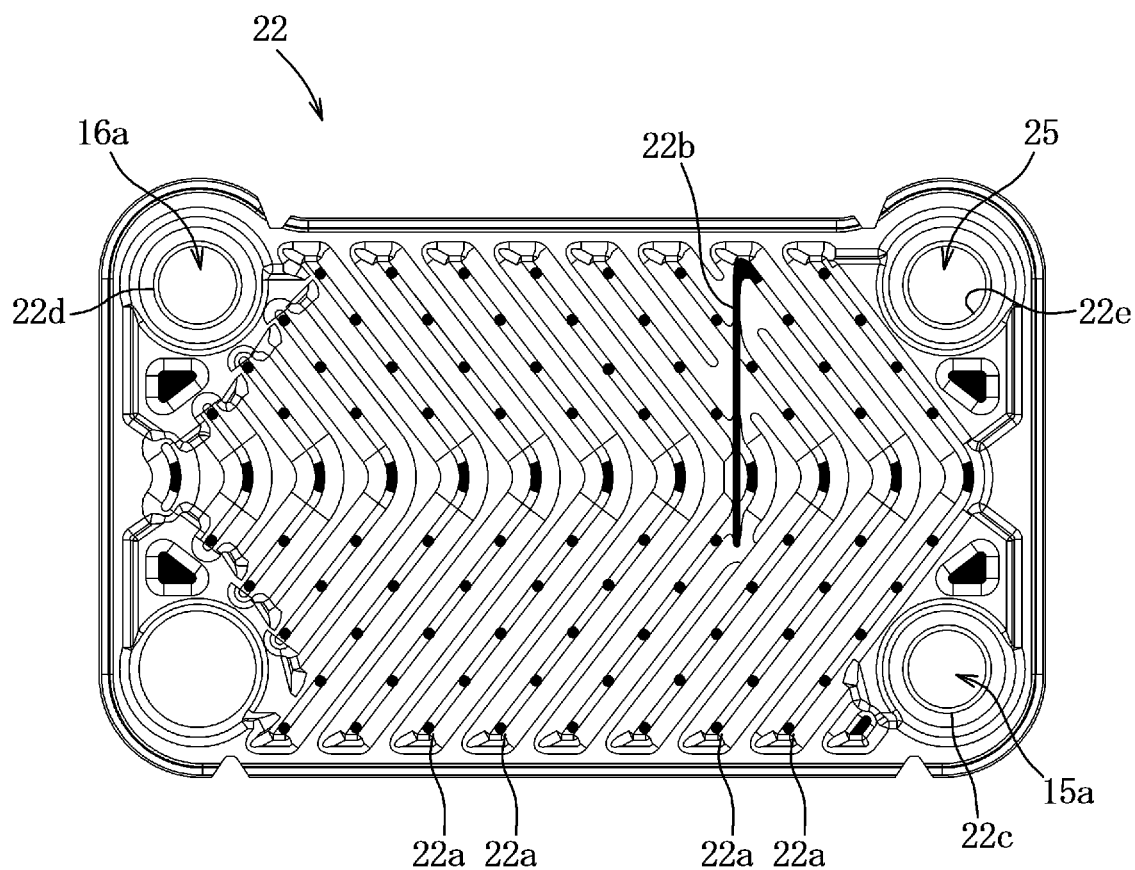
FIG. 6 is a side view of a second plate of the plate laminate in FIG. 4 when viewed from the side of a hot water outlet.

As shown in FIG. 4 to FIG. 6, the plate laminate 13 is formed by alternately laminating two types of rectangular plates including a first plate 21 and a second plate 22. The first plate 21 includes a plurality of protrusion parts 21a that bulge toward the inlet 15 for the heat medium, and the second plate 22 includes a plurality of protrusion parts 22a that bulge to the side opposite to the inlet 15 (side of the discharge opening 16).

In addition, when viewed from the side of the inlet 15, each of the first plates 21 includes a cylinder wall 21c that forms a passage part 15a at a left and lower corner part, a cylinder wall 21d that forms a passage part 16a at a right and upper corner part, and a cylinder wall 21e that forms a hot water passage for hot water supply 25 at a left and upper corner part. The cylinder walls 21c to 21e are formed so that they project to the side in which the protrusion part 21a of the first plate 21 bulges.

Similarly, each of the second plates 22 includes a cylinder wall 22c that forms the passage part 15a, a cylinder wall 22d that forms the passage part 16a, and a cylinder wall 22e that forms the hot water passage for hot water supply 25 at corresponding parts. The cylinder walls 22c and 22d are formed so that they project to the side in which the protrusion part 22a bulges, and the projecting direction is opposite to the cylinder walls 21c and 21d of the first plate 21. The cylinder wall 22e has a projecting direction opposite to the cylinder walls 22c and 22d, that is, the same as the cylinder wall 21e.

When the first plate 21 and the second plate 22 are laminated in this order from the side of the inlet 15, a gap between the first plate 21 and the second plate 22 serves as a gap 23 for a heat medium through which the heat medium flows. The heat medium is supplied to a plurality of gaps 23 for the heat medium from the passage part 15a through which the heat medium introduced from the inlet 15 circulates. The outer edges of the first and second plates 21 and 22 are superimposed in close contact with each other so that the heat medium does not escape to the outside and brazed with a brazing material (not shown).

The heat medium which is supplied from the passage part 15a and flows through the gap 23 for a heat medium passes through the passage part 16a and is discharged from the discharge opening 16. Here, in the outermost first plate 21 of the plate laminate 13, the passage part 16a is blocked with, for example, a cap 16b. In addition, as in the outermost second plate 22 of the plate laminate 13 on the opposite side, the passage part 15a is blocked.

On the other hand, when the second plate 22 and the first plate 21 are laminated in this order from the side of the inlet 15, a gap between the second plate 22 and the first plate 21 serves as a gap 24 for a gas through which a combustion gas flows. In the plurality of gaps for a gas 24, the plurality of protrusion parts 21a and 22a of the first and second plates 21 and 22 are brought into contact with each other, and the outer edges of the first and second plates 21 and 22 are separated from each other, and the combustion gas can flow in and flow out.

The regulating part 13e is formed by regulating protrusion parts 21b and 22b in which predetermined parts of the first and second plates 21 and 22 bulge together with the protrusion parts 21a and 22a. Thus, in the plurality of gaps for a gas 24, the regulating protrusion parts 21b and 22b of the first and second plates 21 and 22 are brought into contact with each other. According to these regulating protrusion parts 21b and 22b, a horizontal flow of the combustion gas toward the discharge part 13b is regulated from the introduction part 13a of the plate laminate 13 to the middle part in the vertical direction. The colored parts in FIG. 6 indicate parts of the second plate 22 that abut the protrusion part 21a and the regulating protrusion part 21b of the first plate 21. These abutting parts are brazed.

Figure 7:
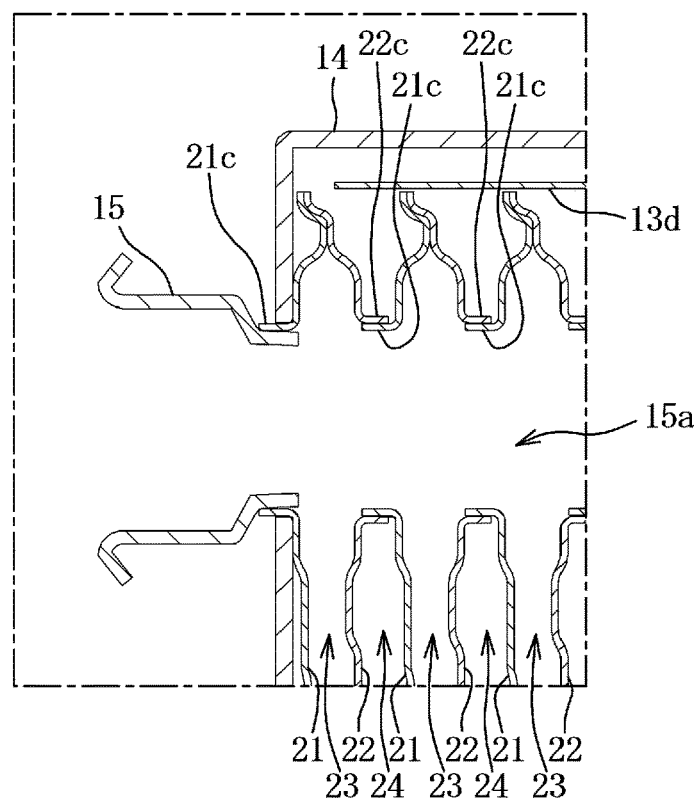
FIG. 7 is a cross-sectional view of main parts of the secondary heat exchanger in FIG. 2 taken along the line VII-VII.

FIG. 7 shows a horizontal cross section of the vicinity of the passage part 15a of the secondary heat exchanger 12. In the gap for a gas 24, in order to form the passage part 15a, the cylinder wall 21c is externally fitted into and superimposed in close contact with the cylinder wall 22c and is brazed with a brazing material (not shown). The outer edges of the first and second plates 21 and 22 that form the gap for a heat medium 23 are superimposed in close contact with each other and brazed with a brazing material (not shown). Although not shown, similarly, in order to form the passage part 16*a*, the cylinder wall 21*d* is externally fitted into and superimposed in close contact with the cylinder wall 22*d* and is brazed. Therefore, the heat medium passage (the passage parts 15*a* and 16*a*, and the gap for a heat medium 23) in the secondary heat exchanger 12 is sealed so that the heat medium does not flow out.

As shown in FIG. 7, the cylinder wall 21*c* of the outermost first plate 21 of the plate laminate 13 is inserted into the side surface part of the secondary heat exchange case 14, and the inlet 15 is fixed. The gap between the secondary heat exchange case 14 and the cylinder wall 21*c*, and the gap between the cylinder wall 21*c* and the inlet 15 are sealed by brazing. Although not shown, similarly, the cylinder wall 22*d* of the outermost second plate 22 of the plate laminate 13 on the side opposite thereto is inserted into the side surface part of the secondary heat exchange case 14, the discharge opening 16 is fixed, and the gap between the secondary heat exchange case 14 and the cylinder wall 22*d*, and the gap between the cylinder wall 22*c* and the discharge opening 16 are sealed.

Figure 8:
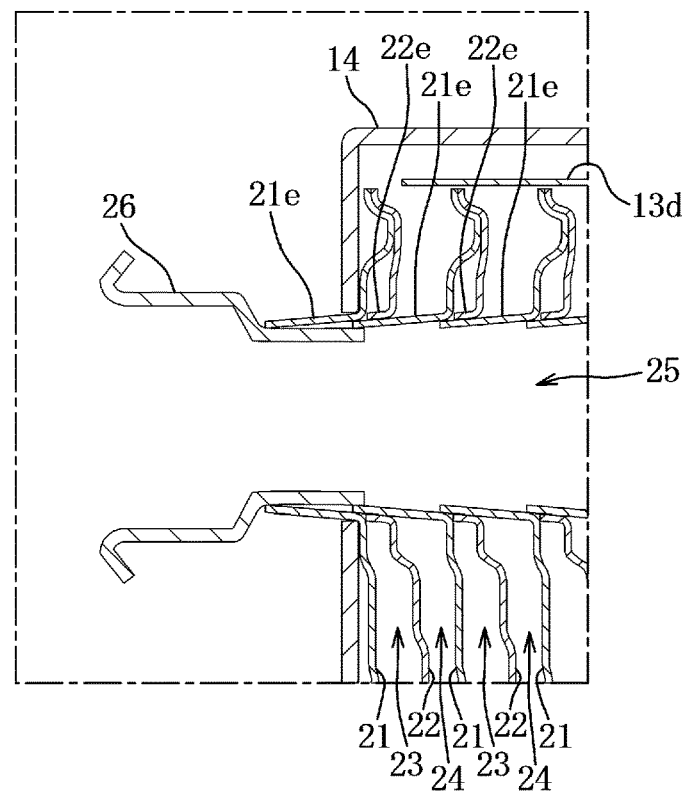
FIG. 8 is a cross-sectional view of main parts of the secondary heat exchanger in FIG. 2 taken along the line VIII-VIII.

FIG. 8 shows a horizontal cross section of the vicinity of the hot water passage for hot water supply 25 of the secondary heat exchanger 12. The cylinder wall 21*e* of each first plate 21 is formed in a tapered shape such that the outer diameter of the distal end thereof is equal to the inner diameter of the proximal end or slightly smaller than the inner diameter. The cylinder wall 21*e* is inserted into the cylinder wall 22*e* of the second plate 22 adjacent to the cylinder wall 21*e* in the projecting direction and is brazed with a brazing material (not shown). Thus, the distal end of the cylinder wall 21*e* is inserted into the proximal end of the cylinder wall 21*e* of the adjacent first plate 21 with the second plate 22 into which the cylinder wall 21*e* is inserted therebetween and is brazed with a brazing material (not shown). The hot water passage for hot water supply 25 is formed by the plurality of cylinder walls 21*e* connected in this manner.

In addition, the cylinder wall 21*e* of the outermost first plate 21 of the plate laminate 13 is inserted into the side surface part of the secondary heat exchange case 14 and the hot water inlet for hot water supply 26 is fixed by brazing. The gap between the secondary heat exchange case 14 and the cylinder wall 21*e* and the gap between the cylinder wall 21*e* and the hot water inlet for hot water supply 26 are sealed by brazing. Although not shown, similarly, the cylinder wall 22*e* of the outermost second plate 22 of the plate laminate 13 on the side opposite thereto is inserted into the side surface part of the secondary heat exchange case 14, the hot water discharge opening for hot water supply 27 is fixed, and the gap between the secondary heat exchange case 14 and the hot water discharge opening for hot water supply 27, and the gap between the hot water discharge opening for hot water supply 27 and the cylinder wall 22*e* are sealed.

In such a plate laminate 13, the gap for a heat medium 23 is adjacent to the gap for a gas 24 with the first and second plates 21 and 22 therebetween, and thus the heat medium is heated from both sides. In addition, the surface area of the plate is enlarged by the protrusion parts 21*a* and 22*a*, and the combustion gas and the heat medium flow with stirring and with fine vortexes formed. Therefore, heat exchange between the combustion gas and the heat medium is efficiently performed.

The hot water passage for hot water supply 25 is provided near the discharge part 13*b* on the furthest downstream side in the combustion gas flow in the plate laminate 13. Hot water for hot water supply (tap water) having a low temperature that circulates through the hot water passage for hot water supply 25 is heated by exchange of heat with the combustion gas that flows before the discharge part 13*b*. The heated tap water is introduced into the heat exchanger for hot water supply 8, and heated by exchange of heat with a high-temperature heat medium heated in the primary heat exchanger 11, and hot water is supplied.

The heat medium introduced from the inlet 15 is a heat medium having a low temperature that is returned from the heating terminal or the heat exchanger for hot water supply 8, but the temperature is not as low as that of tap water. Therefore, tap water having a low temperature is circulated in the hot water passage for hot water supply 25 provided near the discharge part 13*b*, and latent heat of the combustion gas that is not collected by the heat medium is collected by tap water, and thus the a larger amount of heat of the combustion gas can be used.

Figure 9:
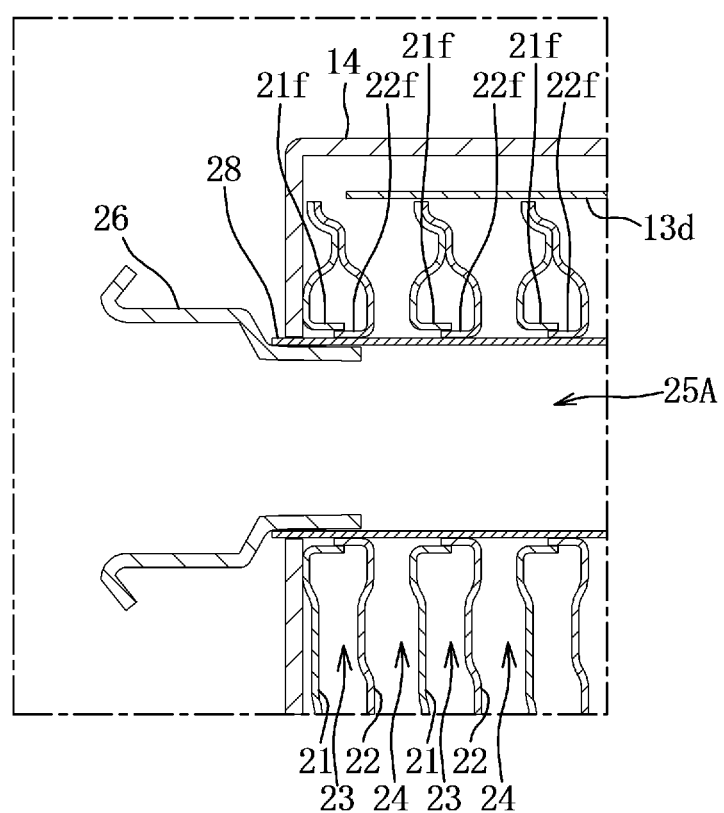
FIG. 9 is a cross-sectional view of main parts showing another example of a hot water passage for hot water supply of the secondary heat exchanger.

In place of the hot water passage for hot water supply 25 formed by the plurality of cylinder walls 21*e*, as shown in FIG. 9, in the secondary heat exchanger 12, a linear hot water pipe for hot water supply 28 is inserted into the plate laminate 13 in the plate lamination direction, and a hot water passage for hot water supply 25A can be formed. In this case, in each gap for a heat medium 23, a passage into which the hot water pipe for hot water supply 28 is inserted is formed by cylinder walls 21*f* and 22*f* of the first and second plates 21 and 22. In addition, the cylinder walls 21*f* and 22*f* are sealed by brazing so that the heat medium does not flow out through the passage.

The hot water pipe for hot water supply 28 is inserted into the side surface part of the secondary heat exchange case 14, and the hot water inlet for hot water supply 26 and the hot water discharge opening for hot water supply 27 (not shown) are fixed to both ends thereof. The gap between the secondary heat exchange case 14 and the hot water pipe for hot water supply 28, the gap between the hot water pipe for hot water supply 28 and the hot water inlet for hot water supply 26, and the gap between the hot water pipe for hot water supply 28 and the hot water discharge opening for hot water supply 27 are sealed by brazing.

Hot water for hot water supply (tap water) having a low temperature that circulates through the hot water passage for hot water supply 25A is heated by exchange of heat with the combustion gas that flows before the discharge part 13*b* in the gap for a gas 24. Therefore, latent heat that has not been collected by the heat medium can be collected using hot water for hot water supply. The heated tap water is introduced into the heat exchanger for hot water supply 8, and heated by exchange of heat with the high-temperature heat medium heated in the primary heat exchanger 11, and hot water is supplied.

Operations and effects of the heating and hot water supply system 1 in the above example will be described.

At a part near the discharge part 13*b* for the combustion gas of the plate type heat exchanger which is the secondary heat exchanger 12 of the heat exchange part 10 that heats the heat medium, the hot water passage for hot water supply 25 (25A) that extends in the plate lamination direction is provided. Therefore, since hot water for hot water supply that circulates through the hot water passage for hot water supply 25 (25A) can be heated in the secondary heat exchanger 12 that heats the heat medium, the secondary heat exchanger for heating hot water for hot water supply is not required, and it is possible to improve a latent heat collection function and reduce the size of the heating and hot water supply system 1.

In addition, since a flow direction of the combustion gas is reversed in the secondary heat exchanger 12 and the gas is discharged to the discharge part 13b, the combustion gas and drainage water can be separated in the secondary heat exchanger 12 and discharged. Thus, since it is not necessary to dispose a member that reverses a flow direction of the combustion gas outside the heat exchange part 10 in order to separate the combustion gas and drainage water, it is possible to reduce the size of the heating and hot water supply system 1. Moreover, since the hot water passage for hot water supply is provided on the furthest downstream side of the combustion gas flow in the secondary heat exchanger 12 near the discharge part 13b, without disturbing heat exchange between the combustion gas and the heat medium, latent heat that has not been collected by the heat medium can be collected using hot water for hot water supply and a latent heat collection function can be improved.

The heat medium passage in the secondary heat exchanger 12 and the hot water passage for hot water supply 25 are sealed. Therefore, since the heat medium or the combustion gas is not mixed with hot water for hot water supply, safe hot water supply can be performed. In addition, since hot water for hot water supply can exchange heat with the combustion gas with the cylinder wall 21e of the first plate 21 therebetween, a latent heat collection function is improved.

The hot water passage for hot water supply 25A is formed by the hot water pipe for hot water supply 28 that penetrates the secondary heat exchanger 12. In this case, it is possible to completely prevent the heat medium and the combustion gas from being mixed in hot water for hot water supply, and the safety of hot water supply is improved.

Hot water for hot water supply that circulates through the hot water passage for hot water supply 25 (25A) and is heated in the secondary heat exchanger 12 is additionally heated by the heat medium heated in the heat exchange part 10 in the heat exchanger for hot water supply 8. Therefore, hot water for hot water supply can be reliably heated to a high temperature and then the hot water can be supplied.

Other Configurations

According to one embodiment, the disclosure provides a heating and hot water supply system, and the system includes a combustion unit that combusts a fuel to generate a combustion gas; a heat exchange unit that heats a heat medium for heating and hot water for hot water supply according to exchange of heat with the combustion gas; and an exhaust unit that exhausts the combustion gas after heat exchange. The heat exchange unit includes a plate type heat exchanger formed by laminating a plurality of vertically upright rectangular plates with gaps therebetween, and is configured to heat the heat medium for heating by causing the combustion gas and the heat medium for heating to alternately flow through the plurality of gaps of the plate type heat exchanger. An inlet for the heat medium for heating is provided at a lower corner part of the plate type heat exchanger, a discharge opening for the heat medium for heating is provided at an upper corner part farthest from the inlet, and a hot water passage for hot water supply through which the hot water for hot water supply flows in a plate lamination direction in the plate type heat exchanger is provided at an upper corner part on the side above the inlet.

According to the above configuration, in the plate type heat exchanger of the heat exchange unit that heats the heat medium for heating, the hot water passage for hot water supply for heating the hot water for hot water supply that flows in the plate lamination direction is provided. Therefore, since the hot water for hot water supply can also be heated in the plate type heat exchanger that heats the heat medium for heating, a latent heat collection function can be improved and the size of the heating and hot water supply system can be reduced.

In one embodiment the combustion gas that flows from the combustion unit in a vertical direction may be vertically or almost vertically introduced into an introduction part that is provided on a side of the combustion unit of the plate type heat exchanger, a flow direction is reversed in the plate type heat exchanger, and the combustion gas is discharged from a discharge part connected to the exhaust unit, and the hot water passage for hot water supply is provided near the discharge part on the furthest downstream side in a combustion gas flow.

According to the above configuration, since the flow direction of the combustion gas is reversed in the plate type heat exchanger and the combustion gas is discharged to the discharge part, the combustion gas and drainage water can be separated in the plate type heat exchanger and discharged. In addition, since it is not necessary to dispose a member that reverses a flow direction of the combustion gas outside the heat exchange unit in order to separate the combustion gas and drainage water, it is possible to reduce the size of the heating and hot water supply system. Moreover, since the hot water passage for hot water supply is provided on the furthest downstream side of the combustion gas flow, without disturbing heat exchange between the combustion gas and the heat medium for heating, latent heat that has not been collected by the heat medium for heating can be collected using the hot water for hot water supply, and the latent heat collection function can be improved.

In one embodiment, a passage for the heat medium for heating and the hot water passage for hot water supply in the plate type heat exchanger may be sealed.

According to the above configuration, since the heat medium for heating and the combustion gas are not mixed into the hot water for hot water supply, safe hot water supply can be performed. In addition, since the hot water for hot water supply can exchange heat with the combustion gas via the plate, the latent heat collection function is improved.

In one embodiment, the hot water passage for hot water supply may be configured by a hot water pipe for hot water supply that penetrates the plate type heat exchanger.

According to the above configuration, it is possible to completely prevent the heat medium for heating and the combustion gas from being mixed into the hot water for hot water supply and it is possible to improve the safety of hot water supply.

In one embodiment, the system may further include a heat exchanger for hot water supply. A discharge opening for the hot water passage for hot water supply may be connected to a hot water inlet for hot water supply of the heat exchanger for hot water supply. The hot water for hot water supply may be heated by the heat medium for heating heated in the heat exchange unit in the heat exchanger for hot water supply.

According to the above configuration, since the hot water for hot water supply is additionally heated by the heat medium for heating heated in the heat exchange unit, it is possible to reliably heat the hot water for hot water supply to a high temperature and hot water can be supplied.

According to the heating and hot water supply system of the disclosure, it is possible to reduce the size of the heating and hot water supply system including a plate type heat exchanger having an improved latent heat collection function.

An example in which the above example is partially modified will be described.

The heating and hot water supply system may have a configuration including an upper combustion type combustion part, a heat exchange part, and an exhaust unit in order from the bottom. In this case, in this configuration, the combustion gas that has flowed in the primary heat exchanger is introduced from above the plate type heat exchanger which is the secondary heat exchanger, the flow direction is reversed in the plate laminate, and the gas is exhausted from the discharge part to the exhaust tube. A duct for introducing the combustion gas from above the plate type heat exchanger is necessary, but the exhaust collecting tube and the exhaust duct can be omitted and the size can be reduced.

In addition, those skilled in the art can implement forms in which various modifications are added to the above embodiment without departing from the spirit of the disclosure, and the disclosure includes such modifications.

What is claimed is:

1. A heating and hot water supply system, comprising:
    a combustion unit that combusts a fuel to generate a combustion gas;
    a heat exchange unit that heats a heat medium for heating and hot water for hot water supply according to exchange of heat with the combustion gas; and
    an exhaust unit that exhausts the combustion gas after heat exchange,
    wherein the heat exchange unit includes a plate type heat exchanger formed by laminating a plurality of vertically upright rectangular plates with gaps therebetween, and is configured to heat the heat medium for heating by causing the combustion gas and the heat medium for heating to alternately flow through the plurality of gaps of the plate type heat exchanger, and
    an inlet for the heat medium for heating is provided at a lower corner part of the plate type heat exchanger, a discharge opening for the heat medium for heating is provided at an upper corner part farthest from the inlet, and a hot water passage for hot water supply through which the hot water for hot water supply flows only in a plate lamination direction in the plate type heat exchanger is provided at an upper corner part on the side above the inlet, but not flows in the gaps between the vertically upright rectangular plates.

2. The heating and hot water supply system according to claim 1,
    wherein the combustion gas that flows from the combustion unit in a vertical direction is vertically or almost vertically introduced into an introduction part that is provided on a side of the combustion unit of the plate type heat exchanger, a flow direction is reversed in the plate type heat exchanger, and the combustion gas is discharged to the exhaust unit, and the hot water passage for hot water supply is provided near the exhaust unit on the furthest downstream side in a combustion gas flow.

3. The heating and hot water supply system according to claim 1,
    wherein a passage for the heat medium for heating and the hot water passage for hot water supply in the plate type heat exchanger are sealed.

4. The heating and hot water supply system according to claim 2,
    wherein a passage for the heat medium for heating and the hot water passage for hot water supply in the plate type heat exchanger are sealed.

5. The heating and hot water supply system according to claim 3,
    wherein the hot water passage for hot water supply is configured by a hot water pipe for hot water supply that penetrates the plate type heat exchanger.

6. The heating and hot water supply system according to claim 4,
    wherein the hot water passage for hot water supply is configured by a hot water pipe for hot water supply that penetrates the plate type heat exchanger.

7. The heating and hot water supply system according to claim 1, further comprising
    a heat exchanger for hot water supply,
    wherein a discharge opening for the hot water passage for hot water supply is connected to a hot water inlet for hot water supply of the heat exchanger for hot water supply, and the hot water for hot water supply is heated by the heat medium for heating heated in the heat exchange unit in the heat exchanger for hot water supply.

8. The heating and hot water supply system according to claim 2, further comprising
    a heat exchanger for hot water supply,
    wherein a discharge opening for the hot water passage for hot water supply is connected to a hot water inlet for hot water supply of the heat exchanger for hot water supply, and the hot water for hot water supply is heated by the heat medium for heating heated in the heat exchange unit in the heat exchanger for hot water supply.

9. The heating and hot water supply system according to claim 3, further comprising
    a heat exchanger for hot water supply,
    wherein a discharge opening for the hot water passage for hot water supply is connected to a hot water inlet for hot water supply of the heat exchanger for hot water supply, and the hot water for hot water supply is heated by the heat medium for heating heated in the heat exchange unit in the heat exchanger for hot water supply.

10. The heating and hot water supply system according to claim 5, further comprising
    a heat exchanger for hot water supply,
    wherein a discharge opening for the hot water passage for hot water supply is connected to a hot water inlet for hot water supply of the heat exchanger for hot water supply, and the hot water for hot water supply is heated by the heat medium for heating heated in the heat exchange unit in the heat exchanger for hot water supply.

* * * * *